(12) United States Patent
Ito et al.

(10) Patent No.: US 7,729,640 B2
(45) Date of Patent: Jun. 1, 2010

(54) CARRIAGE FOR IMAGE SCANNING UNIT INCLUDING RADIATION PLATE FOR CONDUCTING HEAT

(75) Inventors: Tomoya Ito, Aichi (JP); Yuki Nakajima, Gifu (JP); Yoichi Horaguchi, Gifu (JP); Satoshi Mizutani, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 11/940,512

(22) Filed: Nov. 15, 2007

(65) Prior Publication Data

US 2008/0118276 A1    May 22, 2008

(30) Foreign Application Priority Data

Nov. 17, 2006   (JP)   .............. 2006-311102

(51) Int. Cl.
    *G03G 15/04*   (2006.01)
(52) U.S. Cl. .................................... 399/211
(58) Field of Classification Search ............. 399/211
    See application file for complete search history.

(56) References Cited

U.S. PATENT DOCUMENTS

| 5,697,696 | A | 12/1997 | Kuroda |
| 6,448,995 | B1 | 9/2002 | Fujimoto et al. |
| 7,051,941 | B2 | 5/2006 | Yui |
| 7,141,776 | B2 * | 11/2006 | Patterson ................ 250/208.1 |
| 2001/0026699 | A1 * | 10/2001 | Ishikura ...................... 399/81 |
| 2004/0136036 | A1 | 7/2004 | Horaguchi |
| 2006/0077479 | A1 | 4/2006 | Itou |
| 2006/0092617 | A1 | 5/2006 | Mikajiri et al. |

FOREIGN PATENT DOCUMENTS

| JP | 54-103218 U | 7/1979 |
| JP | 56-7940 U | 1/1981 |
| JP | 57-121936 U | 7/1982 |
| JP | 63-23867 U | 2/1988 |
| JP | 5-030288 A | 2/1993 |
| JP | 6-118517 A | 4/1994 |
| JP | 10-197969 A | 7/1998 |

(Continued)

OTHER PUBLICATIONS

Computer Translations for cited references JP06-118517A; JP2002-232650A; & JP2000-253208A.*

(Continued)

*Primary Examiner*—Quana M Grainger
(74) *Attorney, Agent, or Firm*—Banner & Witcoff, Ltd.

(57) ABSTRACT

A carriage for an image scanning unit which scans an image on an object is provided with a light source, a reflecting member placed to face the light source and configured to reflect a light emitted from the light source toward the object to illuminate the image, a housing that contains the light source and the reflecting member, the housing having an opening which allows the light reflected by the reflecting member to pass through and proceed toward the object, and a radiation plate connected to the reflecting member so that heat is conducted from the reflecting member to the radiation plate, at least part of the radiation plate being exposed to outside the housing.

24 Claims, 8 Drawing Sheets

FOREIGN PATENT DOCUMENTS

| | | |
|---|---|---|
| JP | 2000-032211 A | 1/2000 |
| JP | 2000-171917 A | 6/2000 |
| JP | 2000-253208 | 9/2000 |
| JP | 2000-253208 A | 9/2000 |
| JP | 2002-232650 A | 8/2002 |
| JP | 2002-344698 A | 11/2002 |
| JP | 2004-126447 A | 4/2004 |
| JP | 2004-214877 | 7/2004 |
| JP | 2004-228706 A | 8/2004 |
| JP | 2004-266593 A | 9/2004 |
| JP | 2006-115137 A | 4/2006 |
| JP | 2006-148863 A | 6/2006 |
| JP | 2006-191450 A | 7/2006 |
| JP | 2006-197016 A | 7/2006 |
| JP | 5-328017 | 11/2007 |
| JP | 2007-324903 A | 12/2007 |

OTHER PUBLICATIONS

JP Office Action dtd Feb. 03, 2009, JP Appln. 2006-311102.
JP Office Action dtd Sep. 2, 2008, JP Appln. 2006-311102.

* cited by examiner

CARRIAGE FOR IMAGE SCANNING UNIT INCLUDING RADIATION PLATE FOR CONDUCTING HEAT

CROSS-REFERENCE TO RELATED APPLICATION

This application claims priority from Japanese Patent Application No. 2006-311102, filed on Nov. 17, 2006, the entire subject matter of which is incorporated herein by reference.

BACKGROUND

1. Field of the Invention

The present invention relates to a carriage for image scanning unit, an image scanning unit and a multifunction peripheral having an image scanning function. Specifically, the present invention relates to a technique to improve a luminous efficiency of a light source of the carriage for image scanning unit (hereinafter, a carriage for scanning an image will be simply referred to as a carriage).

2. Related Art

Conventionally, a multifunction peripheral (hereinafter, referred to as an MFP) provided with an image scanning function and an image forming function is known. Such an MFP is provided with a moveable carriage beneath a platen glass on which an original document is placed. An example of such a configuration is disclosed in Japanese Patent Provisional Publication No. P2004-214877A.

Typically, the carriage for scanning an image is provided with a reflecting plate for reflecting light emitted from a light source to illuminate the original document. The reflecting plate is arranged to surround the light source such that reflecting surface thereof faces the light source. As a result of this configuration, heat generated by the light source is accumulated in the reflecting plate, and further, radiation of heat of the light source is prevented. Therefore, the temperature of the light source is likely to increase. In particular, when a plurality of original documents are scanned continuously, or a relatively long time is spent for scanning an image at a high resolution, light emitting period becomes relatively long. In such a case, the temperature of the light source tends to increase extraordinary. There are light sources (e.g., a cold cathode tube) which have characteristics such that luminous efficiency is deteriorated as the temperature increase. When the luminous efficiency is deteriorated, the light intensity becomes insufficient, which may adversely effect image scanning.

SUMMARY OF THE INVENTION

The present invention is advantageous in that there is provided an improved carriage, image scanning unit, and multifunction peripheral having an image scanning function, which are configured such that accumulation of heat at the light source is suppressed.

According to an aspect of the invention, there is provided a carriage for an image scanning unit which scans an image on an object. The carriage is provided with a light source, a reflecting member placed to face the light source and configured to reflect a light emitted from the light source toward the object to illuminate the image, a housing that contains the light source and the reflecting member, the housing having an opening which allows the light reflected by the reflecting member to pass through and proceed toward the object, and a radiation plate connected to the reflecting member so that heat is conducted from the reflecting member to the radiation plate, at least part of the radiation plate being exposed to outside the housing.

According to another aspect, there is provided an image scanning unit employing the carriage as above. The carriage may be movable to scan an image.

According to a further aspect, there is provided a multifunction peripheral having a plurality of functional units, one of which may be the image scanning unit described above.

According to the above configurations, the heat from the light source and accumulated in the reflecting member is conducted to the radiation member and radiated outside the carriage. Since the reflecting member contact the radiation member, increase of the temperature of the reflecting member provided around the light source can be suppressed.

BRIEF DESCRIPTION OF THE ACCOMPANYING DRAWINGS

DETAILED DESCRIPTION OF THE EMBODIMENT

Hereinafter, referring to the accompanying drawings, illustrative embodiments and modifications of a carriage for image scanning unit according to the present invention will be described.

First Embodiment

General Configuration of a Multifunction Peripheral

Figure 1:
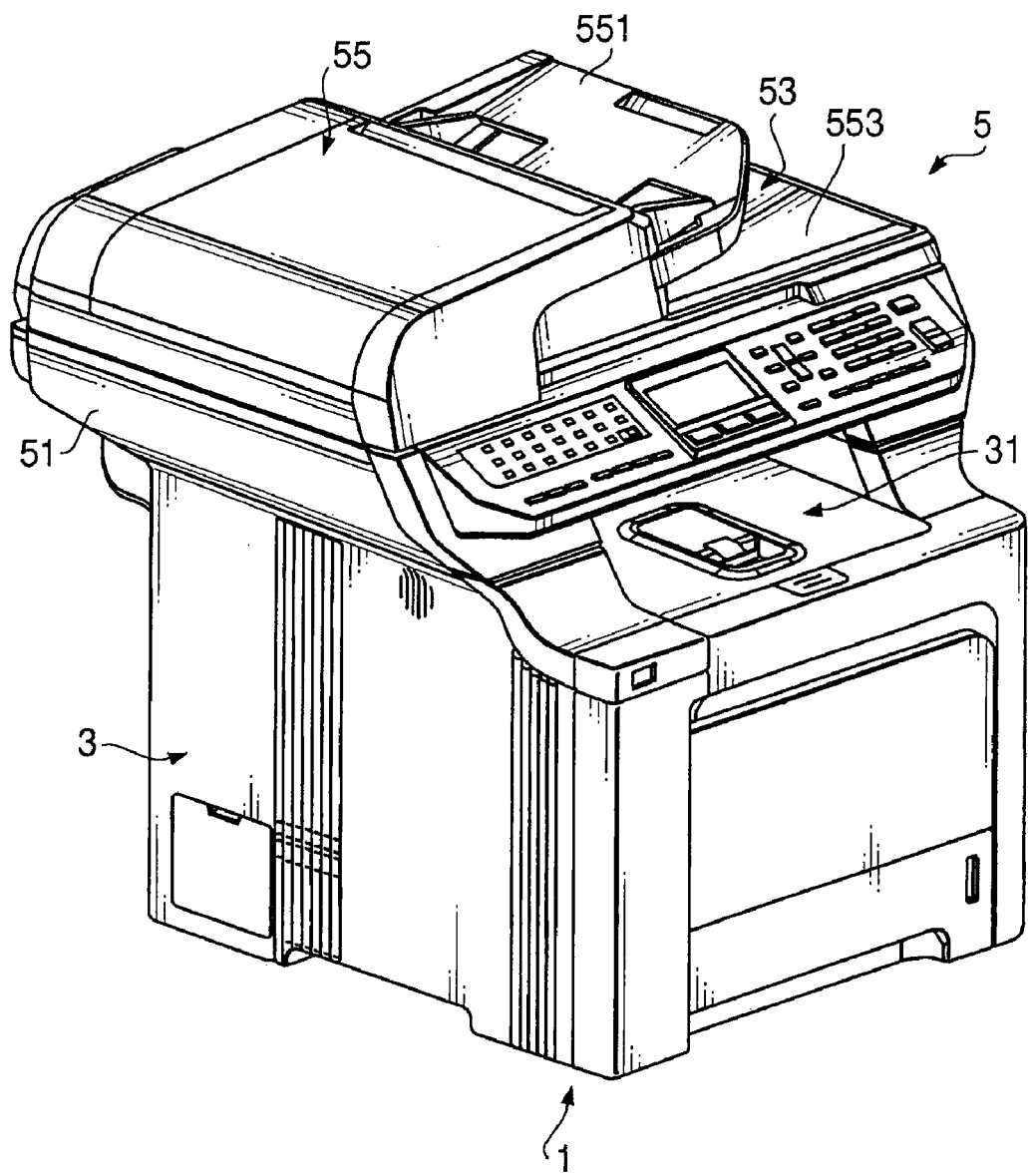
FIG. 1 is a perspective view of a multifunction peripheral according to an embodiment of the present invention.

FIG. 1 is a perspective view of a multifunction peripheral 1 (hereinafter referred to as the "MFP") according to the present invention. As shown FIG. 1, the MFP is provided with an image forming unit 3 and an image scanning unit 5. The image scanning unit 5 is above the image forming unit 3 and a sheet discharging space 31 is defined between the image forming unit 3 and the image scanning unit 5.

The image forming unit 3 is an electrophotographic type image forming unit which prints an image scanned by the image scanning unit 5 on a recording sheet and discharges the sheet to the sheet discharging space 31. It should be noted that the image forming device 3 may not be the electrophotographic type but an inkjet type or a thermal type image forming unit.

The image scanning unit 5 is includes a CCD (Charge Coupled Device) as an image sensor, a main body 51 and a document holder 53. The document holder 53 is supported by the main body 51 so as to be opened/closed with respect to the main body 51.

Figure 2:
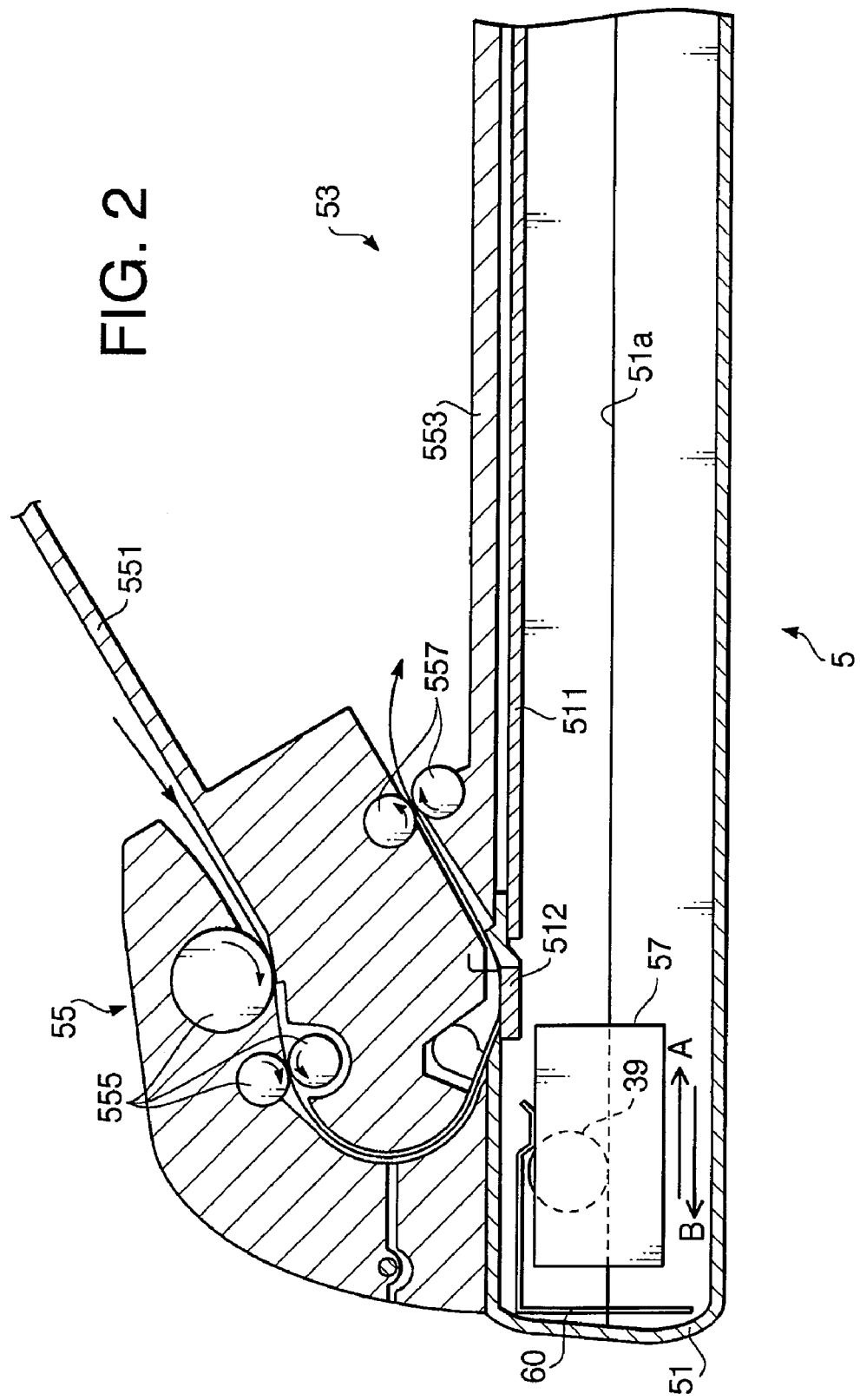
FIG. 2 is a cross sectional view of an image scanning unit of the multifunction peripheral shown in FIG. 1.

FIG. 2 is a cross sectional view of the image scanning unit 5. As shown in FIG. 2, the main body 51 is provided with a carriage 57 for image scanning, a first platen glass 511 on which an original document to be scanned is placed, a second platen glass 512 at which an original document fed by an automatic document feeder 55 (hereinafter referred to as the "ADF") is scanned, and a heat radiation member 60 provided to the main body 51.

Figure 4A:
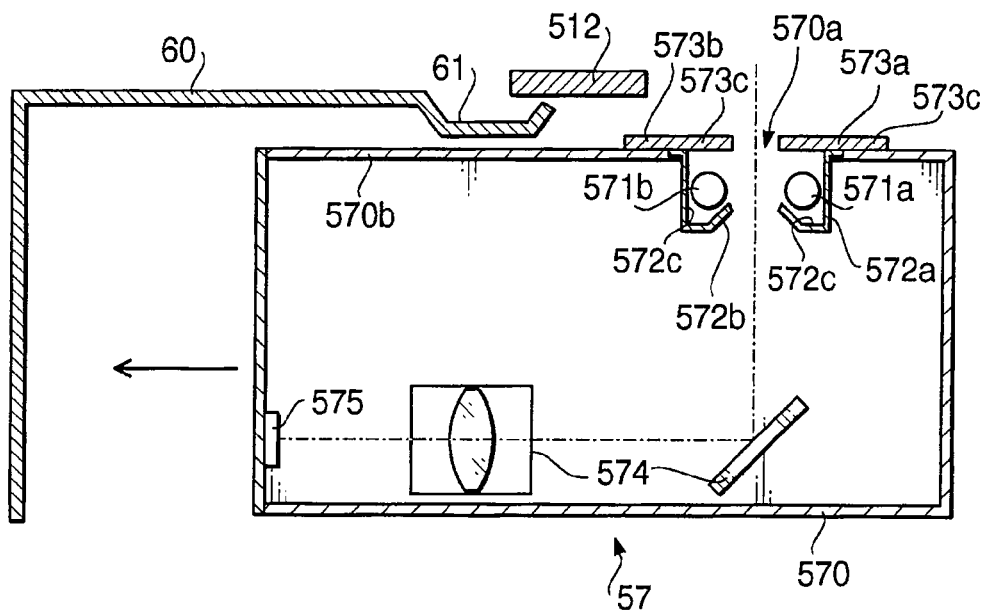
FIG. 4A is a cross sectional view of the carriage when an original document placed on a first platen glass is read.
Figure 4B:
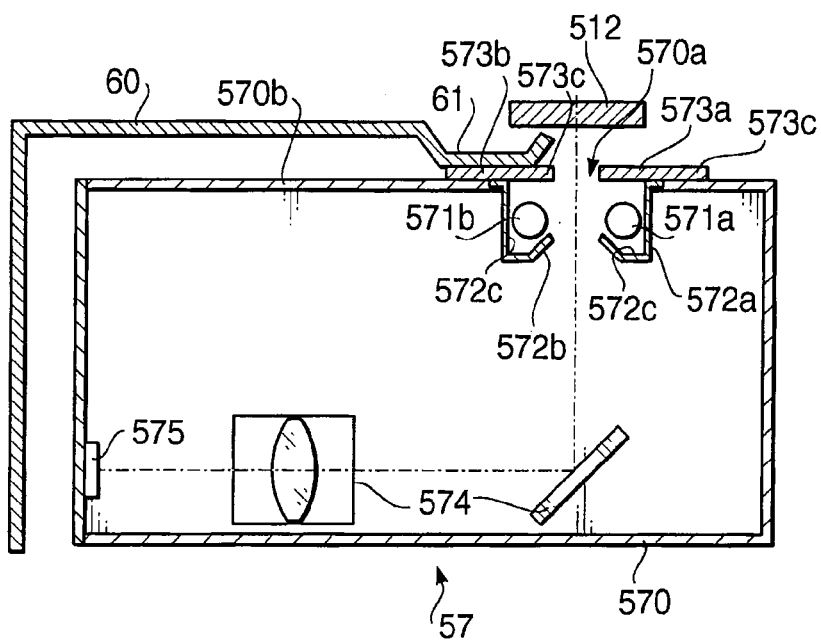
FIG. 4B is a cross sectional view of the carriage when an original document fed by an ADF is scanned.

The carriage 57 is provided with a light source 571a (see FIGS. 4A and 4B). Light emitted by the light source 571a illuminates the original document placed on the first platen glass 511 or located on the second platen glass 512. An image is scanned by receiving the light reflected by the original document. The carriage 57 is configured to be movable beneath the first platen glass 511 and the second platen glass 512 with a roller 39, which rotates on a guide surface 51a when the carriage is pulled by a belt driving mechanism (not shown) in a direction indicated by arrow A and arrow B.

The document holder 53 includes a document pressing section 553 which faces the first platen glass 511 when the document holder 53 is closed, and the ADF 55 which is located above the second platen glass 512 and functions as the document holder when the original document fed by the ADF 55 is scanned.

The document pressing section 553 has a flat plate shape and is configured to press the original document toward the first platen glass 511 when the document holder 53 is closed.

The ADF 55 is provided with a document table 551, a sheet feeding mechanism 555 and a sheet discharging mechanism 557. A plurality of original documents placed on the document table 551 are fed to the second platen glass 512 one by one, by the sheet feeding mechanism 555, and discharged on an upper surface of the document pressing section 553. The image of the original document fed on the second platen glass 512 is scanned by the carriage 57 which moves below the second platen glass 512.

The heat radiating member 60 is made of material which efficiently radiates heat. According to the embodiment, the heat radiation member 60 is an aluminum plate, which is arranged so to be able to contact the carriage 57 and radiates the heat accumulated in the carriage 57.

<Configuration and Operation of the Carriage>

Figure 3:
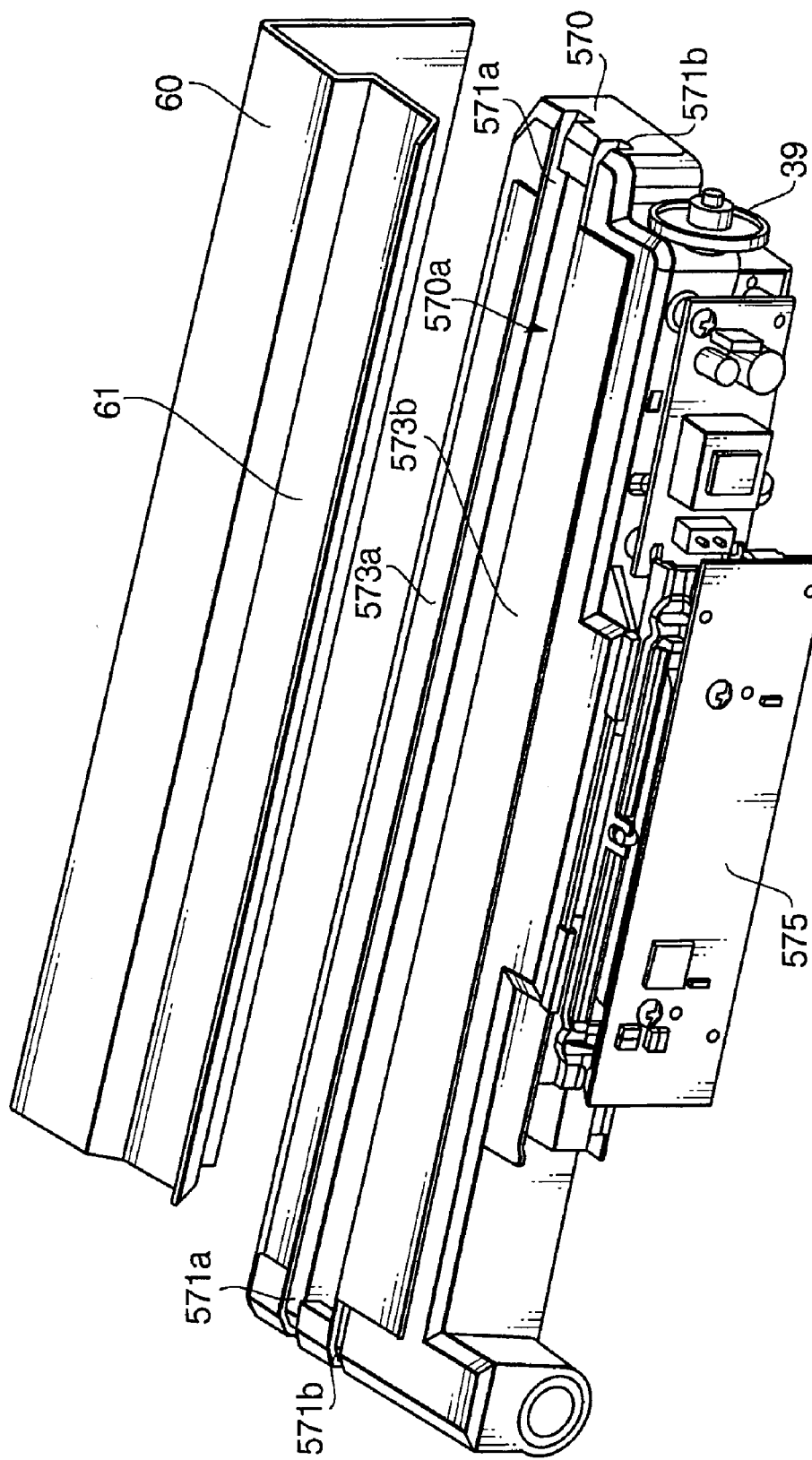
FIG. 3 is a perspective view of a carriage of the image scanning unit shown in FIG. 2.

FIG. 3 is a perspective view of the carriage 57 and the radiation member 60. FIGS. 4A and 4B are cross sectional view of the carriage 57 and the radiation member 60. Specifically, FIG. 4A shows a case where the original document placed on the first platen glass 511 is scanned, and FIG. 4B shows a case where the original document fed by the ADF 55 is scanned at the second platen glass 512.

As shown in FIGS. 4A and 4B, the carriage 57 has a carriage housing 570, the light sources 571a and 571b, reflecting plates 572a and 572b, radiation plates 573a and 573b, an optical system 574 and an image sensor 575.

The carriage housing 570 is made of black resin that absorbs the light to prevent occurrence of straying light due to the diffuse reflection on the original document. The carriage housing 570 is provided with an elongated rectangular opening 570a on a top surface 570b which faces the first platen glass 511 and second platen glass 512 for allowing the light to enter the carriage housing 570.

Each of the light sources 571a and 571b is a cold cathode tube having a cylindrical shape. The light sources 571a and 571b are arranged in parallel with longer sides of the rectangular opening 570a and face each other.

The reflecting plates 572a and 572b are arranged to surround part of the light sources 571a and 571b. As shown in FIGS. 4A and 4B, the reflecting plates 572a and 572b are arranged such that bent portions are secured at the edges of the rectangular opening (570a) side. The radiation plates 573a and 573b are arranged to cover the opening 570a such that the light emitted by the light sources 571a and 571b is reflected by the reflecting plates 572a and 572b and is directed toward the first platen glass 511 or the second platen glass 512 via the rectangular opening 570a. Specifically, each of the reflecting plates 572a and 572b is made of an aluminum plate which is folded to have a hook-shaped cross section taken along a plane perpendicular to the longer side of the rectangular opening 570a. An inner surface 572c of each of the reflecting plates 572a and 572b is formed as a mirror surface and is arranged to surround each of the light sources 571a and 571b with some clearance therebetween.

The heat radiation plates 573a and 573b are aluminum plates and placed on the top surface 570b of the carriage housing 570. The radiation plates 573a and 573b contact the reflecting plates 572a and 572b, respectively, so that the radiation plates 573a and 573b radiate the heat of the reflecting plates 572a and 572b, which is conducted through the contacted portions, from the outer (external) surfaces of the radiation plates 573a and 573b.

Each of the radiation plates 573a and 573b covers the opening 570a leaving the rectangular opening (slit) therebetween so as not to block the reflected light from the original document. The inner (lower) surfaces of the radiation plates 573a and 573b facing the light sources 571a and 571b are preferably configured as mirrored surfaces. With this structure, the radiation plates 573a and 573b also function as reflecting plates. On the other hand, the outer (upper) surfaces 573c of the radiation plates 573a and 573b are formed with antireflection coating to prevent occurrence of the straying light due to scattering of light, which is reflected by and directed from the original document, by the outer surfaces 573c. The outer surfaces 573c may be processed to have a black surface to absorb the incident light or a coarse surface to interfere with the light. As the process to form the black surface, the outer surfaces 573c may be coated with black paint or the outer surfaces 573c may be blackened chemically by inducing aluminum hydroxide when the radiation plates 573a and 573b are aluminum plates.

The optical system 574 is provided with a mirror and a lens, etc. The optical system 574 leads the light impinging from the rectangular opening 570a, which is emitted from the light sources 571a and 571b and then reflected by the original document through the first platen glass 511 or second platen glass 512, to the image sensor 575.

The image sensor 575, which is a CCD sensor, detects the light led by the optical system 574 and incident on the image sensor 575.

The carriage 57 is movable in the directions indicated by the arrows A and B, as shown in FIG. 2. When the original document fed by the ADF is scanned, the carriage 57 is moved to a position where the opening 570a faces the second platen glass 512 as shown in FIG. 4B. Incidentally, the radiation member 60 is formed as a plate spring made of aluminum as shown in FIG. 3, and arranged so that a contact section 61 of the radiation member 60 contacts the outer surface 573c of the plate 573b. When the original document placed on the first platen glass 511 is scanned, the carriage 57 is driven to move such that the opening 570a translates in parallel with a surface of the first platen glass 511. In this case, the radiation member 60 and the radiation plate 573b are separated as shown in FIG. 4A.

With the carriage according to the embodiment described above, the heat accumulated in the reflecting plates 572a and 572b is conducted to the radiation plates 573a and 573b which are arranged to contact the reflecting plates 572a and 572b as shown in FIGS. 4A and 4B.

According to the above-described structure of the carriage 57, accumulation of heat in the reflecting plates 572a and 572b is conducted to the radiation plates 573a and 573b. Therefore, the temperature around the light sources 571a and 571b can be decreased in comparison with a carriage having a conventional structure. As the increase of temperature of the light sources 571a and 571b is suppressed, lowering of luminous efficiency of the light sources 571a and 571b can be suppressed. Since the radiation plates 573a and 573b are arranged outside the carriage housing 570, the heat is not accumulated inside the carriage housing 570. Further, the radiation plates 573a and 573b are arranged such that the inner surfaces thereof face the light sources 571a and 571b to function as reflecting plates. Therefore, part of the heat of the light sources 571a and 571b is directly radiated outside the carriage housing 570 without being conducted through the reflecting plates 572a and 572b. Accordingly, increase of the temperature around the light sources 571a and 571b can be suppressed efficiently.

In particular, when the original document fed by the ADF is scanned, since a plurality of documents is scanned with the carriage 57 remaining in the same place, the heat from the light sources 571a and 571b is likely to be accumulated. However, in the image scanning unit according to the above-described embodiment, the heat accumulated in the radiation plate 573b is conducted to the radiation member 60 that contact the radiation plate 573b. Therefore, even when the original document fed by the ADF is read, increase of the temperature of the light source 571b is suppressed, thereby preventing the luminous efficiency of the light source 571b from being lowered. The radiation member 60 is formed to have a function of a plate spring. Therefore, it is ensured that the contact section 61 contacts the radiation plate 573b by the urging force generated by the radiation member 60. Consequently, radiation efficiency of the radiation plate 573b can be further improved.

Recently, image scanners are required to have light sources capable of emitting light having higher intensity in order to ensure scanning images at high speed. The above configuration is particularly advantageous to meet such a requirement, and effective in image scanners having a plurality of light sources and/or a light source configured to emit light having higher intensity, since, in such image scanners, the temperature of the light source(s) may easily rise.

Second Embodiment

According to the first embodiment, two radiation plates 573a and 573b are separately arranged in the carriage 57 in the first embodiment. It should be noted that the radiation plates may be connected or formed as a single member. According to a second embodiment described hereinafter, the radiation plates are configured so that the two radiation plates can conduct heat to each other. According to the description of the second embodiment, a carriage 67 has substantially the same configuration as the carriage 57 according to the first embodiment. Therefore, only the different members such as radiation plates 673a and 673b, etc. are assigned reference numbers different from those of the first embodiment, while the same reference numbers are assigned to the members which are the same as those of the first embodiment and description thereof will be omitted for brevity.

Figure 5:
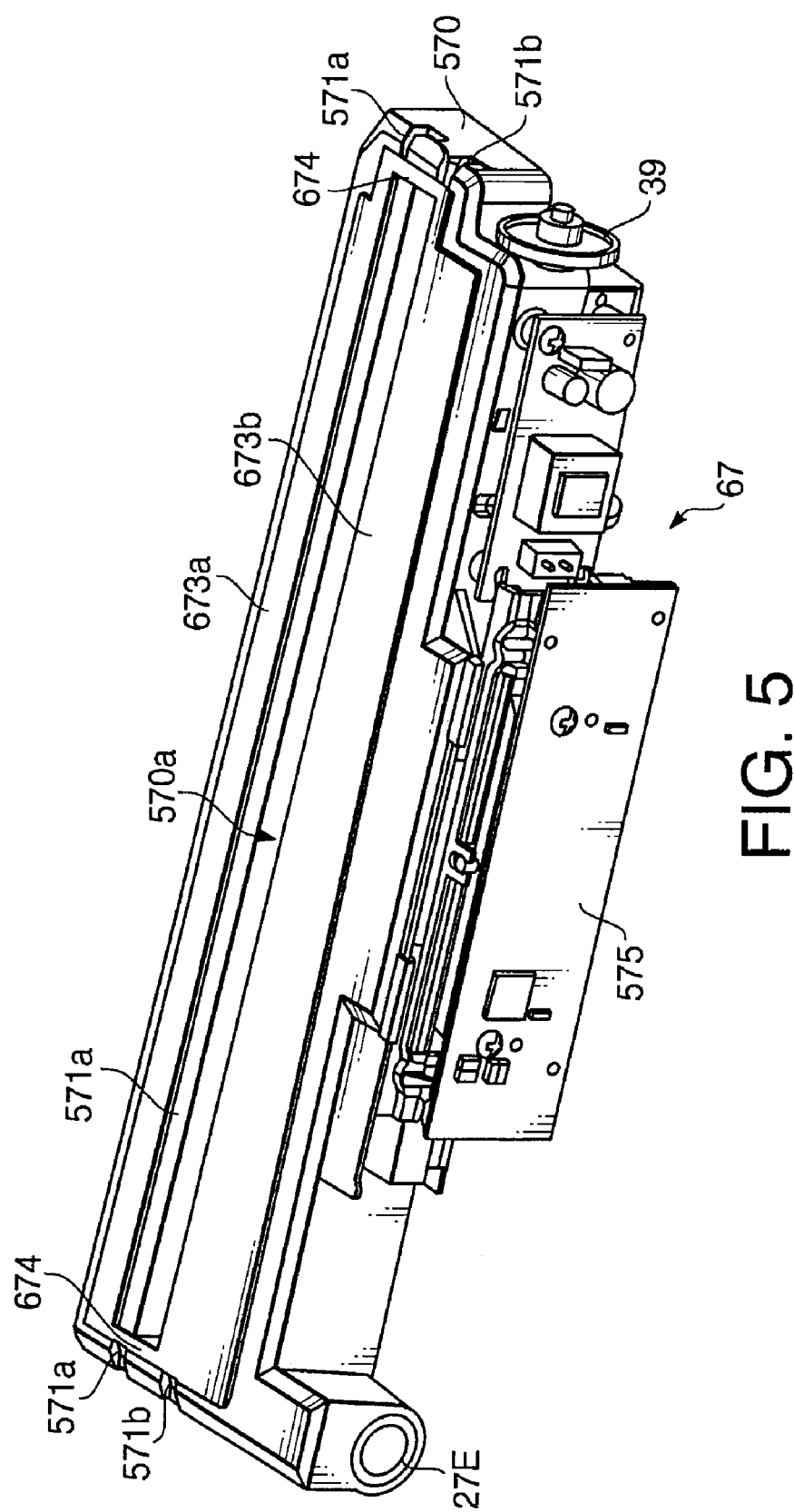
FIG. 5 is a perspective view of a carriage according to a second embodiment of the present invention.

FIG. 5 is a perspective view of the carriage 67 according to the second embodiment.

As shown in FIG. 5, the radiation plates 673a and 673b are connected by connecting sections 674 which connect the longitudinal side ends of the radiation plates 673a and 673b, respectively.

The connecting sections 674 are made of aluminum plates and formed integrally with the radiation plates 673a and 673b. The integrally formed radiation plate having the radiation plates 673a, 673b, and connecting sections 674 covers the opening 570a formed on the upper surface of the carriage, above the light sources 571a and 571b (see FIGS. 4A and 4B). The radiation plates 673a, 673b, and connecting sections 674 define the rectangular opening, which allows the light to pass therethrough so that the original document is illuminated by the light, and the reflected light is directed to the image sensor 575.

With the above configuration, when the original document fed by the ADF is scanned as shown in FIG. 4B, the heat is conducted to the radiation member 60 not only from the radiation plate 673b, which corresponds to the radiation plate 573b in FIG. 4B, but from the radiation releasing plate 673a via the connecting sections 674. Therefore, the heat generated by the light source 571a can also be radiated effectively. That is, according to the configuration of the second embodiment, the heat from more than one light source (e.g., the light sources 571a and 571b) can be evenly radiated. Consequently, lowering of the luminous efficiency of the light sources 571a and 571b due to an increase of the temperature can be prevented.

Third Embodiment

According to the second embodiment, the connecting sections 674 connecting the radiation plates 673a and 673b are arranged on the top surface of the carriage 67. According to a third embodiment, connecting sections 774 are arranged on side surfaces 770 of the housing of a carriage 77. According to the description on the third embodiment, a carriage 77 has substantially the same configuration as the carriage 57 according to the first embodiment. Therefore, only the different members such as radiation plates 773a and 773b, radiation member 62, etc. are assigned to reference numbers different from those of the first embodiment, while the same reference numbers are assigned to the members same as those of the first embodiment and description thereof will be omitted for brevity.

Figure 6:
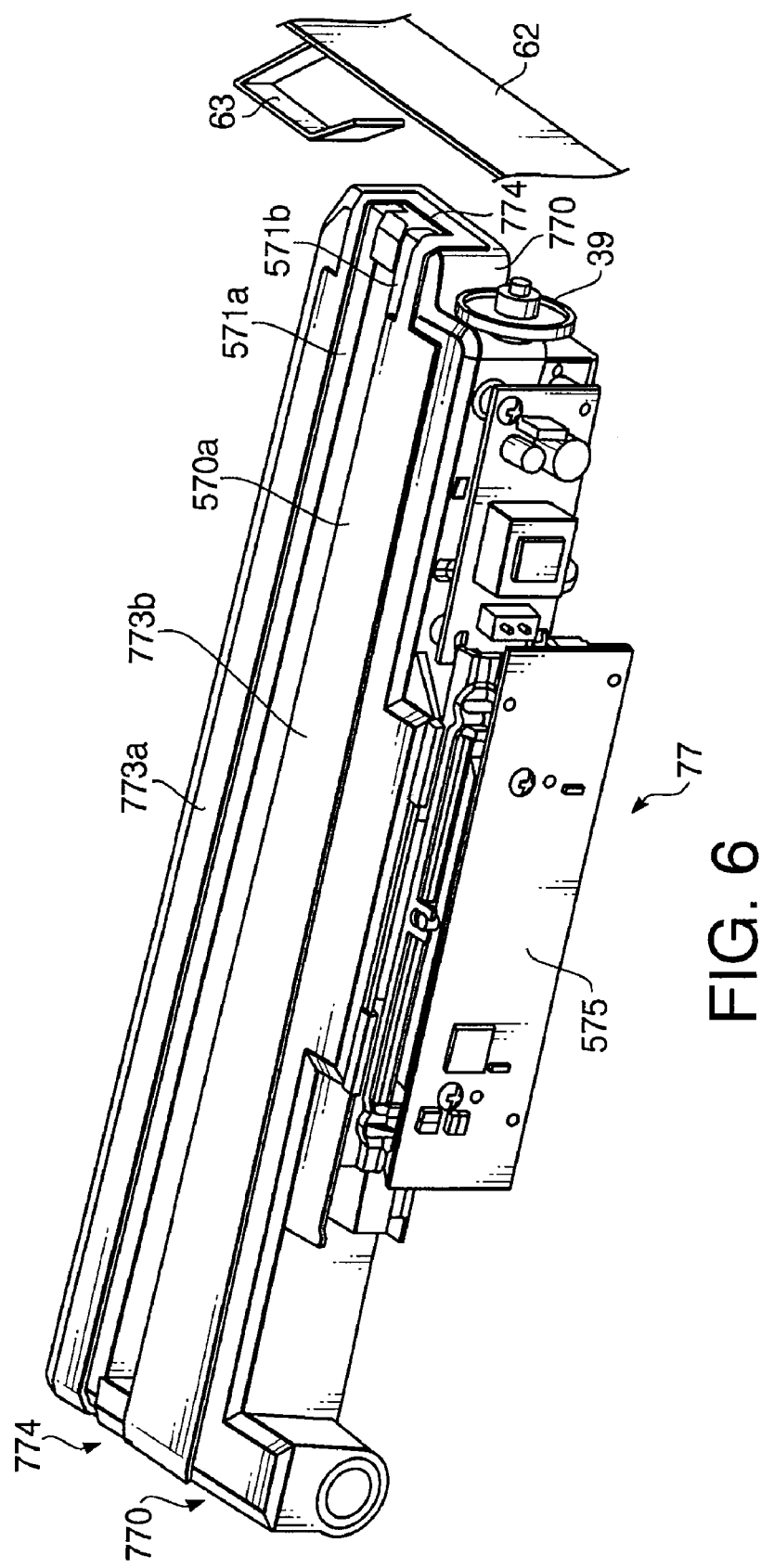
FIG. 6 is a perspective view of a carriage according to a third embodiment of the present invention.

FIG. 6 is a perspective view of the carriage 77 according to the third embodiment.

As shown in FIG. 6, the radiation plates 773a and 773b are connected by connecting portions 774 at longitudinal edges thereof.

The connecting sections 774 are made of aluminum plates formed integrally with the radiation plates 773a and 773b. Specifically, each of the connecting sections 774 is a U-shaped plate and both ends of the letter U are connected to the longitudinal end portions of the radiation plates 773a and 773b, respectively. The radiation plates 773a and 773b are arranged on the upper surface of the carriage 77, while the connecting sections 774 are bent so as to be arranged on the side surfaces 770 of the carriage 77. Thus, the integrally formed radiation plate having the radiation plates 773a, 773b and the connections sections 774 is L-shaped in a front view.

With the above configuration, since the connecting section 774 does not block the scanning area at both sides of the rectangular opening 570a, the length of the rectangular opening 570a in the longitudinal direction can be made longer in comparison with the configurations of the first and second embodiments. In other words, even if the length of the carriage 77 in the longitudinal direction is made shorter in comparison with the first and second embodiments, the length of the rectangular opening 570a can be remained unchanged, according to the third embodiment. Therefore, the size of the carriage 77 can be reduced by setting the length of the carriage 77 in a width direction.

In the above configuration, the radiating member 60 of the first embodiment may be employed to contact the radiation plate 773a as in the first embodiment. Alternatively, as shown in FIG. 6, a radiating member 62 may be employed, which faces one side surface 770 of the housing of the carriage 77, and a contacting section 63 is formed to the radiating member 62 so as to contact the connecting section 774. With this configuration, since the radiating member 62 is arranged to face the side face 770 of the carriage 77, the height of the image scanning unit can be decreased.

<Modifications>

The carriages 57, 67 and 77 may be modified as follows.

According to the above-described embodiments, a clearance is provided between the light sources and the reflecting plates. The invention need not be limited to such a configuration, and the reflecting plates and the light sources may be arranged to contact each other. Such a configuration will be explained taking the light source 571b as an example.

Figure 7:
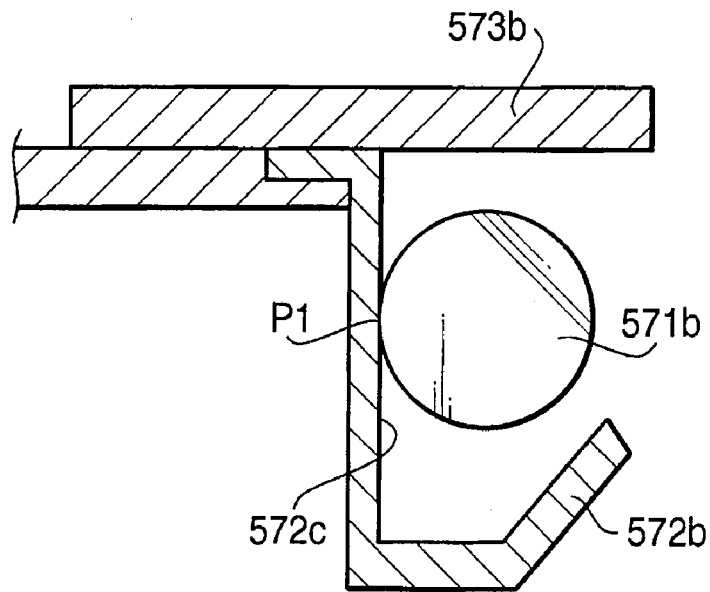
FIG. 7 is a cross sectional view showing a portion around a light source of a carriage according to a first modification of the present invention.

FIG. 7 is an enlarged cross sectional view of the light source 571b, a reflecting plate 572b and radiation plate 573b according to a first modification.

As shown in FIG. 7, the light source 571b is arranged to contact the inner surface 572c of the reflecting plate 572b at a point P1. It should be noted that the point P1 is a point on the cross section, and the light source 571b contacts the reflecting plate 572b linearly. With this configuration, since the heat of the light source 571b is conducted to the reflecting plate 572b directly, the heat of the light source 571b can be radiated efficiently in comparison with a case where the heat is conducted from the light source 571b to the reflecting plate 572b via the air.

Figure 8:
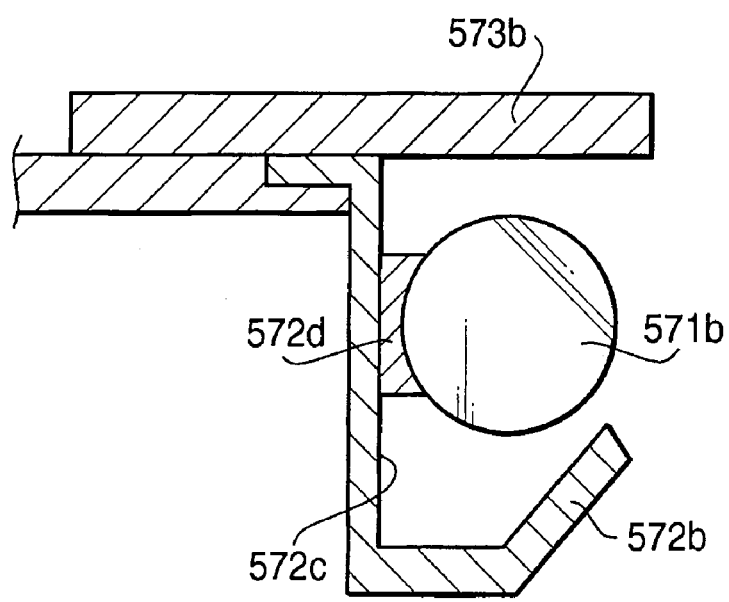
FIG. 8 is a cross sectional view showing a portion around a light source of a carriage according to a second modification of the present invention.

FIG. 8 is an enlarged cross sectional view of a portion around the light source 571b according to a second modification.

The configuration shown in FIG. 8 is similar to the first modification except that heat conductive member 572d is provided between the light source 571b and the reflecting plate 572c. This configuration achieves the same effect as the first modified example. Additionally, by using a transmissive silicon resin as the radiation plate 572b, a loss of the light is suppressed.

Figure 9:
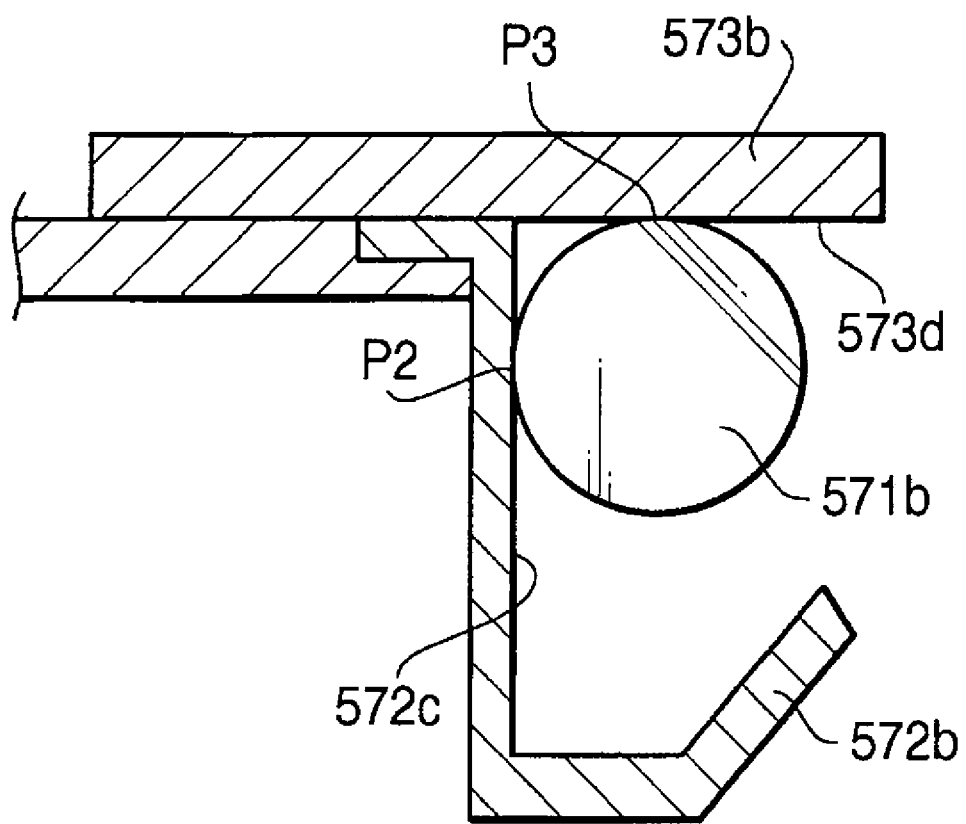
FIG. 9 is a cross sectional view showing a portion around a light source of a carriage according to a third modification of the present invention.

FIG. 9 is a cross sectional view of a portion around the light source 571b according to a third modification.

As shown in FIG. 9, according to the third modification, the light source 571b contacts the reflecting plate 572b at points P2, in the cross section, and contacts the radiation plate 573b at point P3, in the cross section. Accordingly, the light source 571b contacts the reflecting plate 572b along a line, and also contacts the radiation plate 573b along another line. With this configuration, the increase of the temperature of the light source 571b can be suppressed since it the number of the contact points for conducting the heat of the light source 571b is increased. Additionally, the light source 571b may be configured to contact the radiation plate 572b at the point P2 and/or P3 via heat conductive members.

While the above embodiments are explained as an application to an image scanning unit of the MFP as an example, the present invention can be applied to a stand-alone image scanning device.

While the cold cathode tube is used as the light source in the above embodiments, the invention can be applied to any light source whose luminous efficiency declines as the temperature rises, such as an LED.

While the CCD is used as the image sensor in the above embodiments, a CIS (contact image sensor) may be employed.

While the image sensor is provided inside the carriage in the above embodiments, the image sensor may be configured as a separate unit and may be provided in the main body 51 of the scanning unit 5.

While the carriage housing 570 is made of resin in the above embodiments, the carriage housing may be made of metal. Further, the entire carriage 57 may be made of metal.

While the radiation member and the reflecting plates are formed as separate members, and are arranged to contact each other in the above embodiments, the radiation member and the reflecting plates may be formed integrally as a single member.

The present invention is not limited to the above described embodiments and modifications, and components thereof may be suitably combined to achieve the similar effect of the invention.

What is claimed is:

1. A carriage for an image scanning unit which scans an image on an object, comprising:
    a light source;
    a reflecting member placed to face the light source and configured to reflect light emitted from the light source toward the object to illuminate the image;
    a housing that contains the light source and the reflecting member, the housing having an opening which allows the light reflected by the reflecting member to pass through and proceed toward the object; and
    a radiation plate connected to the reflecting member so that heat is conducted from the reflecting member to the radiation plate, at least part of the radiation plate being exposed to outside the housing,
    wherein the radiation plate is positioned at the opening and arranged to face the light source.

2. The carriage according to claim 1, wherein an inner surface of the radiation plate facing the light source is formed to be a mirror surface.

3. The carriage according to claim 1, wherein an outer surface of the radiation plate is formed with an antireflection coating.

4. The carriage according to claim 3, wherein the antireflection coating is a black coating.

5. The carriage according to claim 1,
    wherein a plurality of light sources is provided to the carriage, and
    wherein the radiation plate is provided for each of the plurality of the light sources.

6. The carriage according to claim 5, wherein the radiation plate comprises
    a first radiation plate provided for one of the plurality of light sources, and
    a second radiation plate provided for another of the plurality of light sources, and wherein the carriage further comprises a heat conductive connecting member connecting the first radiation plate and the second radiation plate, and configured to conduct heat between the first radiation plate and second radiation plate.

7. A carriage for an image scanning unit which scans an image on an object, comprising:

a light source;

a reflecting member placed to face the light source and configured to reflect light emitted from the light source toward the object to illuminate the image;

a housing that contains the light source and the reflecting member, the housing having an opening which allows the light reflected by the reflecting member to pass through and proceed toward the object; and a radiation plate connected to the reflecting heat is conducted from the reflecting member to the radiation plate, at least part of the radiation plate being exposed to outside the housing, wherein the light source is arranged to contact at least one of the reflecting member and the radiation plate.

8. The carriage according to claim 1, wherein the light source is arranged to contact at least one of the reflecting member and the radiation plate via a heat conductive member.

9. The carriage according to claim 1, wherein the radiation plate is arranged at a position which does not block a light path of the light reflected by the object.

10. An image scanning unit comprising:

a carriage which is movable inside the image scanning unit, wherein the carriage comprises:

a light source;

a reflecting member placed to face the light source and configured to reflect light emitted from the light source toward an object to illuminate an image;

a housing that contains the light source and the reflecting member, the housing having an opening which allows the light reflected by the reflecting member to pass through and proceed toward the object; and a radiation plate connected to the reflecting member so that heat is conducted from the reflecting member to the radiation plate, at least part of the radiation plate being exposed to outside the housing, wherein the radiation plate is positioned at the opening and arranged to face the light source.

11. The image scanning unit according to claim 10, wherein an outer surface of the radiation plate is formed with an antireflection coating.

12. The image scanning unit according to claim 10, wherein a plurality of light sources is provided to the carriage, and wherein the radiation plate is provided for each of the plurality of the light sources.

13. The image scanning unit according to claim 12, wherein the carriage includes:

a first radiation plate provided for one of the plurality of light sources;

a second radiation plate provided for another of the plurality of light sources; and a heat conductive connecting member connecting the first radiation plate and the second radiation plat, and configured to conduct heat between the first radiation plate and second radiation plate.

14. An image scanning unit comprising:

a carriage which is movable inside the image scanning unit, wherein the carriage comprises:

a light source;

a reflecting member placed to face the light source and configured to reflect light emitted from the light source toward an object to illuminate an image;

a housing that contains the light source and the reflecting member, the housing having an opening which allows the light reflecting member to pass through and proceed toward the object; and a radiation plate connected to the reflecting member so that heat is conducted from the reflecting member to the radiation plate, at least part of the radiation plate being exposed to outside the housing, wherein the light source is arranged to contact at least one of the reflecting member and the radiation plate.

15. The image scanning unit according to claim 10, wherein the light source is arranged to contact at least one of the reflecting member and the radiation plate via a heat conductive member.

16. The image scanning unit according to claim 10, wherein the carriage further includes:

a radiation member provided to the image scanning unit, the radiation member being arranged to contact the radiation plate when the carriage is moved to a position for image scanning.

17. The image scanning unit according to claim 16, wherein the radiation member is formed with a plate spring configured to press the radiation plate when the carriage is moved to the position for image scanning.

18. The image scanning unit according to claim 16, wherein the carriage further includes an automatic document feeder, and wherein the radiation member contacts the radiation plate when the carriage is moved to a position for scanning an image of a document fed by the automatic document feeder.

19. A multifunction peripheral comprising:

a plurality of functional units including an image scanning unit, the image scanning unit includes a carriage, which comprises:

a light source;

a reflecting member placed to face the light source and configured to reflect light emitted from the light source toward an object to illuminate an image;

a housing that contains the light source and the reflecting member, the housing having an opening which allows the light reflected by the reflecting member to pass through and proceed toward the object;

a radiation plate connected to the reflecting member so that heat is conducted from the reflecting member to the radiation plate, at least part of the radiation plate being exposed to outside the housing, wherein the radiation plate is positioned at the opening and arranged to face the light source.

20. The multifunction peripheral according to claim 19, wherein an outer surface of the radiation plate is formed with an antireflection coating.

21. The multifunction peripheral according to claim 19, wherein the carriage further includes a radiation member provided to the image scanning unit, the radiation member being arranged to contact the radiation plate when the carriage is moved to a position for image scanning.

22. The multifunction peripheral according to claim 21, wherein the radiation member is formed with a plate spring configured to press the radiation plate when the carriage is moved to the position for image scanning.

23. The multifunction peripheral according to claim 21 wherein the carriage further includes an automatic document feeder, and wherein the radiation member contacts the radiation plate when the carriage is moved to a position for scanning an image of a document fed by the automatic document feeder.

24. The multifunction peripheral according to claim 20, wherein an inner surface of the radiation plate facing the light source is formed to be a mirror surface.

* * * * *